Oct. 25, 1949.  B. O. KUEHLHORN  2,486,178
HOT FOOD CARTON
Filed Nov. 16, 1946  4 Sheets-Sheet 1
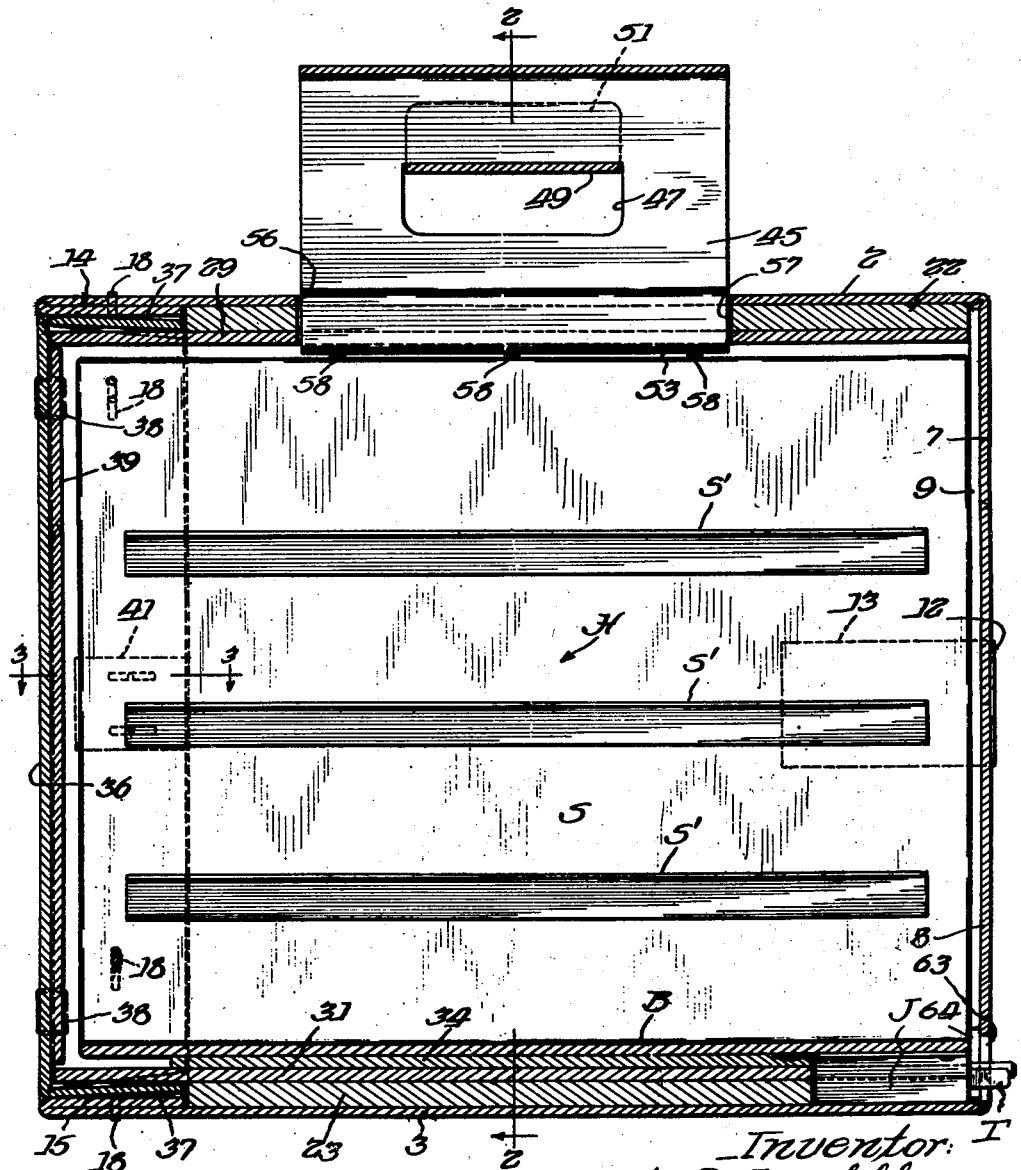
Inventor:
Bert O. Kuehlhorn.
By Hill & Lee
Attys

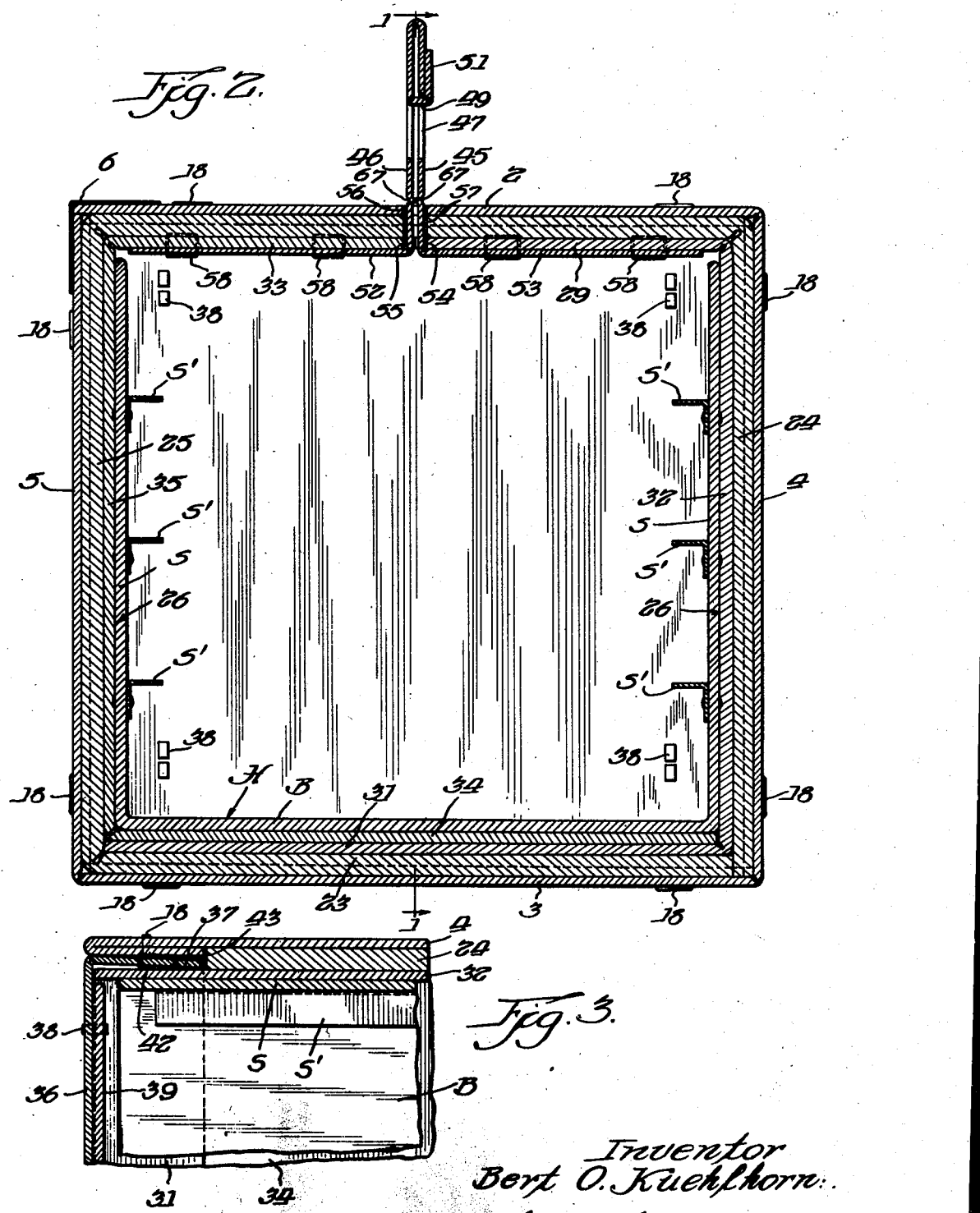

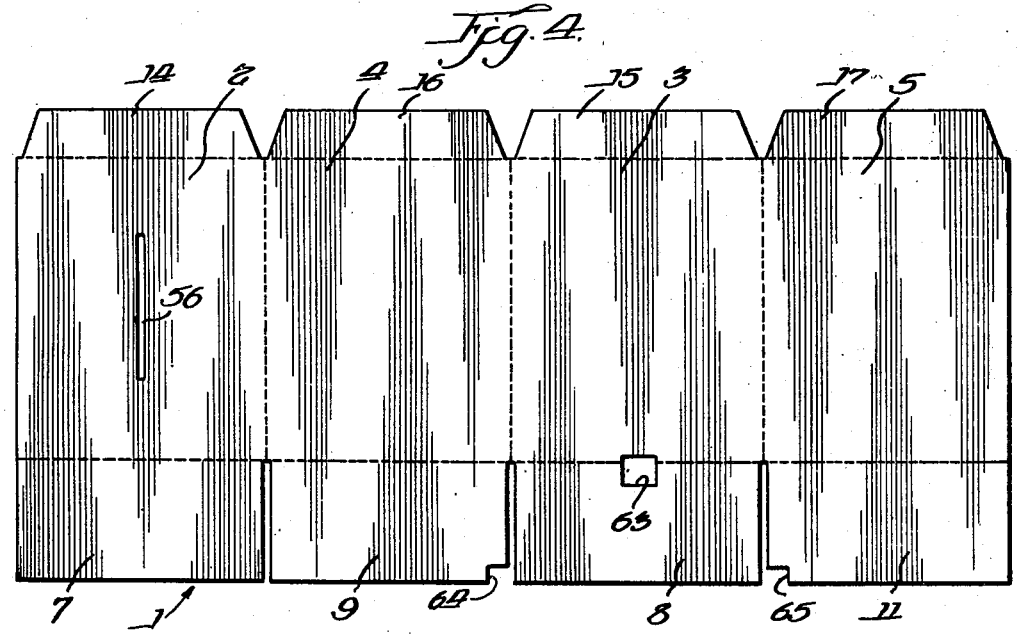
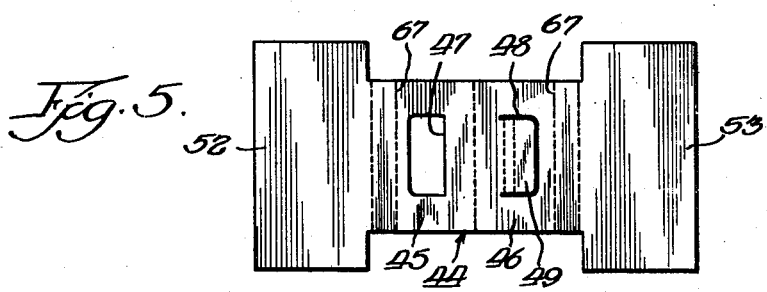
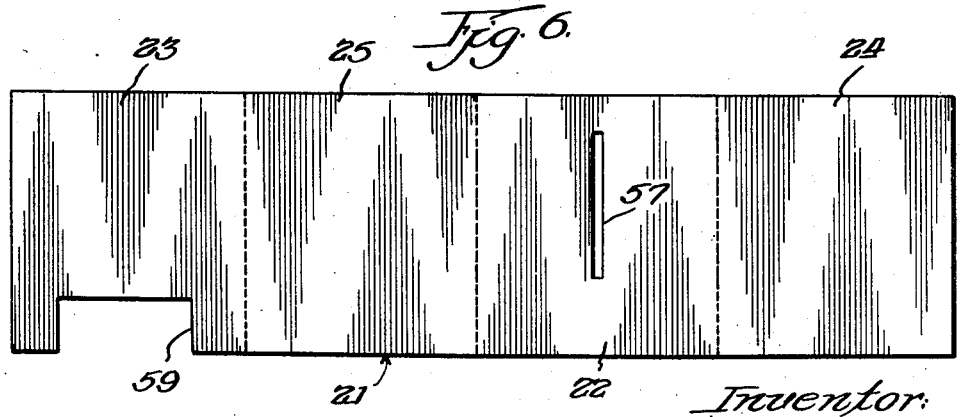

Oct. 25, 1949.　　　　B. O. KUEHLHORN　　　　2,486,178
HOT FOOD CARTON
Filed Nov. 16, 1946　　　　　　　　　　　　　4 Sheets-Sheet 4
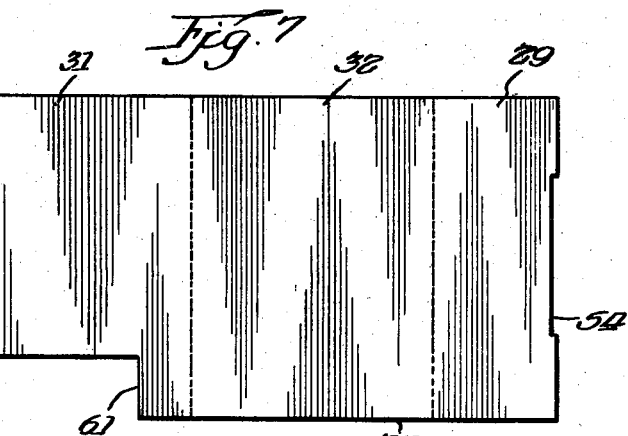
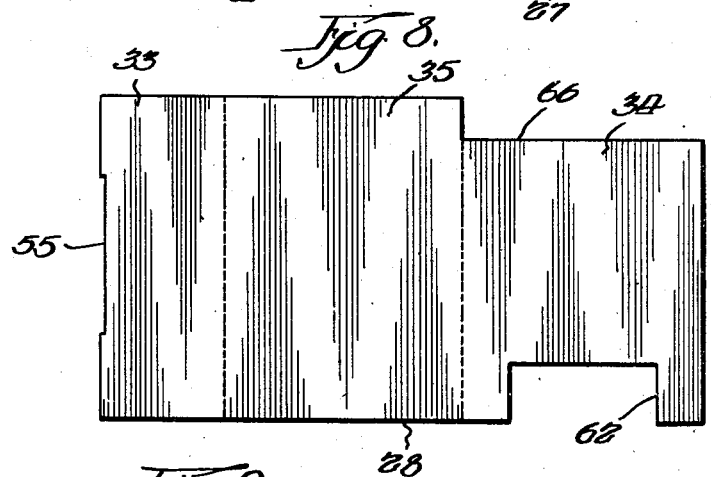
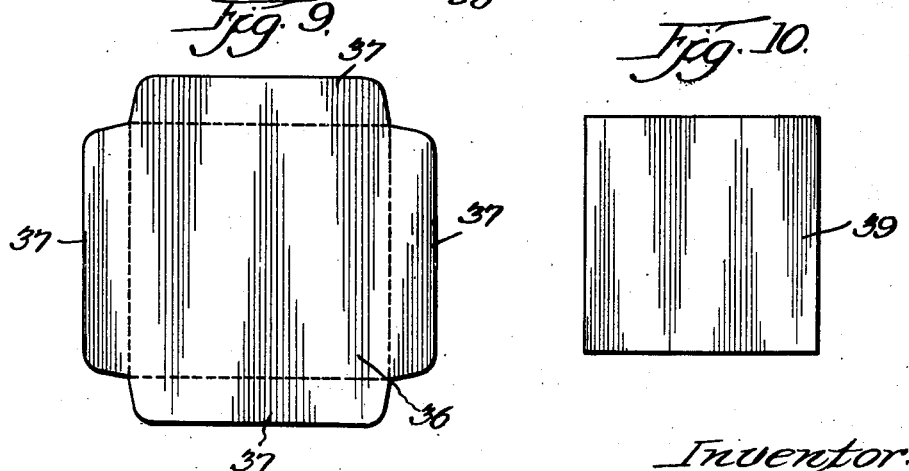
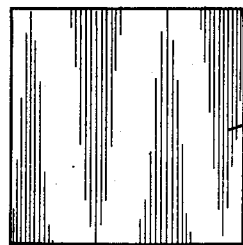
Inventor:
Bert O. Kuehlhorn.
By　Stice & Stice
　　　　Attys.

Patented Oct. 25, 1949

2,486,178

UNITED STATES PATENT OFFICE 2,486,178

HOT FOOD CARTON

Bert O. Kuehlhorn, Chicago, Ill.

Application November 16, 1946, Serial No. 710,391

5 Claims. (Cl. 229—14)

1

The invention relates generally to containers of fibre board, corrugated board or the like, and more particularly to a container adapted to hold heated food or other articles.

The invention has among its objects the production of such a container which possesses desirable heat retention characteristics, and is so constructed that the cover may efficiently seal the same.

Another object of the invention is the construction of such a container in which the various elements, other than the cover, are locked in place, at the same time securely retaining a heating element, if desired, within the container.

A further object of the invention is the production of such a container constructed of fibre board, corrugated board or the like, having a carrying handle therefor, which container is so constructed that stresses are distributed from the handle to the ends and cover of the container, thereby preventing distortion thereof when being carried by the handle.

A further object of the invention is the production of such a container, having a novel liner construction adapted to receive a heating unit or the like, in which either the outer body portion of the container or the interior portion of the latter may be replaced without replacing the other, resulting in a considerable saving in replacement costs.

A further object of the invention is the production of such a container which is relatively inexpensive to manufacture, simple in construction, and durable in use.

Many other objects and advantages of the construction herein shown and described will be obvious to those skilled in the art from the disclosure herein given.

To this end my invention consists in the novel construction, arrangement and combination of parts herein shown and described, and more particularly pointed out in the appended claims.

In the drawings, wherein like reference characters indicate like or corresponding parts;

Fig. 1 is a sectional view taken approximately on the line 1—1 of Fig. 2 of a container embodying the present invention;

Fig. 2 is a sectional view of the container illustrated in Fig. 1, taken approximately on the line 2—2 of Fig. 1;

2

Fig. 3 is a sectional view taken approximately on the line 3—3 of Fig. 1;

Fig. 4 is a development of the outer body or housing member employed;

Fig. 5 is a similar development of the handle member;

Fig. 6 is a development of the outer liner;

Fig. 7 is a development of one section of the inner liner;

Fig. 8 is a similar development of the other inner liner section;

Fig. 9 is a development of the cover member; and

Fig. 10 is a plan view of the cover liner.

The present invention is particularly adapted for use with a heating element of a size to fit in the container, whereby the latter may be employed as a receptacle for food, the food being kept warm by the heating element until served. Such containers are particularly useful where it is desired to keep food warm for a limited period of time prior to serving, as, for example, on an airplane, train or the like. In such case the food may be prepared ready for serving and placed in the container, whereby the heating element will keep the food warm until the time of serving.

The present invention is illustrated in the drawings in conjunction with a heating element of a type in use at the present time, the details of which form no part of the present invention.

Referring particularly to Figs. 1, 2 and 4, I indicates generally the outer body or housing member, formed in the present instance from a single sheet of any suitable material, such as fibre board, corrugated board or the like, and having a top wall 2, bottom wall 3 and side walls 4 and 5.

The sheet is folded along the junctures of the top and bottom with their respective side walls to bring the free edge of the side wall 5 adjacent to the corresponding edge of the top wall 2, the two being secured together by suitable fabric or paper tape 6, or the like, thereby forming a hollow structure. Extending from the walls 2, 3, 4 and 5 at one of their corresponding ends, are integrally connected half end walls 7, 8, 9 and 11 carried respectively by the top wall 2, bottom wall 3, and side walls 4 and 5. As illustrated in Fig. 1, the half end walls 9 and 11 are folded inwardly toward each other, with their opposing edges in substantially abutting relation to form an inner end wall, and in like manner the half end walls 7 and 8 are folded inwardly over the first pair, with the opposed edges of the halves 7 and 8 in abutting relation to form an outer end wall. The latter halves are secured in position by a suitable tape 12 overlying the juncture of the two halves 7 and 8, and extending around and secured to the adjacent side walls 4 and 5, as indicated at 13. The opposite ends of the top wall 2, bottom wall 3 and side walls 4 and 5, are provided with flaps 14, 15, 16 and 17 respectively. These flaps are folded inwardly into the body 1 and, as illustrated in Figs. 1 and 3, may be secured in position by staples 18 passing through the flaps and the adjacent body walls, thereby forming a smooth reinforced edge at the open end of the body member.

Positioned in the body member so formed is an outer liner indicated generally by the numeral 21, formed in the present instance from a single sheet of material, comprising a top portion 22, bottom portion 23 and side portions 24 and 25 respectively, the sheet being folded along the connecting edges of the respective portions, whereby the liner may be positioned within the body 1, the lateral dimensions of the respective portions being such that the outer surfaces of the liner 21 will contact the respective adjacent surfaces of the body walls, the depth or length of the respective portions being approximately equal to the distance between the inner edges of the flaps 14, 15, 16 and 17, and the inner end wall formed by the halves 9 and 11. Thus it will be noted that the edges of the outer liner 21, adjacent the open end of the body member, are seated behind the inner edges of the flaps 14, 15, 16 and 17, thereby locking the outer liner in the body member.

As illustrated in Fig. 1, it will be noted that the thickness of the outer liner 21 is approximately twice that of the respective flaps.

Positioned within the outer liner 21 is an inner liner designated generally by the numeral 26, comprising in the embodiment of the invention illustrated, two sections or halves 27 and 28, the developments of which are illustrated in Figs. 7 and 8 respectively. The section 27 is provided with a half top portion 29, and a bottom portion 31, connected by a side portion 32, while the section 28 comprises a corresponding half top portion 33 and bottom portion 34, connected by a side portion 35. The transverse dimensions of the respective portions are such that when folded along their connecting edges and inserted within the outer liner 21, as illustrated in Fig. 2, the two top portions will contact the adjacent surface of the top of the outer liner, with the opposed or meeting edges of the respective top portions of the inner liner in abutting relation. Likewise, the side portions 32 and 35 will have their outer faces contacting the adjacent faces of the side walls 24 and 25 respectively of the outer liner 21. The bottom portion 31 of the section 27 is positioned with its outer face seated upon the adjacent surface of the outer liner bottom 23, while the bottom 34 of the section 28 is positioned upon the bottom portion 31 of the other section, and acts as a spacer for a heating unit positioned therein.

Referring to Fig. 1, it will be noted that the depth or length of the respective portions 29, 31, 32, 33 and 35 of the inner liner, is slightly less than the distance between the inner end wall of the body member and the open end thereof.

The open end of the container is closed by a cover or door 36, the development of which is illustrated in Fig. 9. The cover 36 is provided with peripheral flanges or flaps 37 integrally connected therewith and adapted to be folded at substantially right angles to the plane of the cover. Secured to the inner face of the cover member 36 by staples 38, or other suitable means, is a liner member 39, for providing additional stiffening and insulating qualities to the cover member. The latter is engaged with the body member 1 by inserting the respective flanges 37 of the cover member between the flaps 14, 15, 16 and 17 of the body member, and the adjacent portions of the inner liner 26, as clearly illustrated in Figs. 1 and 3, the flaps 37 being of approximately the same width as the respective flaps 14, 15, 16 and 17. It will be noted that the cover liner 29 is positioned within the inner liner, thus providing an additional sealing action. The cover member 36, in the embodiment illustrated in the drawings, is constructed of substantially the same material as the body member 1, and as the thickness of the outer liner 21 is approximately twice the thickness of the material forming the cover member and body member, a relatively snug fit between the elements is achieved, which in conjunction with the resilient action of the cover material at the junctures of the flanges and the flanges 37, sufficient frictional engagement is achieved under normal conditions to hold the cover in position. However, if desired, additional means may be provided for locking the cover in closed position. One example of means accomplishing this result is illustrated in Figs. 1 and 3, and comprises a small metal plate 41 or the like, which may be secured to oppositely disposed flanges 37 of the cover member by staples 42, or other suitable means, the plate 41 being provided, adjacent the edge of the flange 37, with an outwardly extending flange 43, adapted to engage the inner edge of the flaps 16 and 17. Thus, when the flanges 37 are inserted between the inner liner and the flaps 16 or 17, the flange 43 will lock behind the edge of the respective body flaps. The cover may be removed from the body member by urging the flanges 37 of the cover inwardly to disengage the flange 43 and permit withdrawal of the flanges 37 from the body member.

To facilitate transporting the container, a handle, indicated generally by the numeral 44, is provided, the handle being shown in development in Fig. 5. In the illustrated embodiment of the invention, the handle 44 is formed from a single sheet of material folded back upon itself to form a hand engageable portion of double thickness, comprising the portions 45 and 46, the portion 45 having a finger receiving opening 47 therein, and the portion 46 having a U-shaped slot 48 therein to form a flap 49, which may be folded and inserted through the opening 47, with the end 51 of the flap folded back along the portion 45, as clearly illustrated in Fig. 2, the end 51 of the flap, if desired, being secured in position by any suitable means. The opposite edges of the portions 45 and 46 are provided with ears 52 and 53 respectively, adapted to be folded outwardly in opposite directions, as clearly illustrated in Fig. 2.

The top portions 29 and 33 of the inner liner sections 27 and 28 respectively, are provided with complementary notches 54 and 55 respectively. The top wall 2 of the body member 1 and the top portion 22 of the outer liner, are provided with slots 56 and 57 respectively, aligned with the complementary notches 54 and 55 when the respective members are in assembled relation, as illustrated in Figs. 1 and 2. The slots 56 and 57, as well as the slot formed by the complementary notches 54 and 55, are of a size to permit passage of the hand engageable portions 45 and 46 of the handle member therethrough, whereby the ears 52 and 53 may contact the top portions 33 and 29 respectively of the inner liner, and be secured thereto by any suitable means, as, for example, staples 58.

It will be noted that with this construction stresses are transmitted to the outer liner 21 and the body 1. Similarly, due to the interlocking construction of the cover with the body 1 and inner liner 26, stresses are transmitted from the top portions 29 and 33 of the inner liner to the adajcent flange of the cover member, and from the flange 37 directly to the cover 36. Thus, any tendency of bulging in the top wall 2 of the body member 1, when the container is being carried by the handle, is materially reduced, if not substantially eliminated, as the weight of the container is distributed between the side walls, end wall and cover of the device. It will be apparent that if desired, the handle member 44 may be formed integrally with the inner liner instead of separately formed and secured thereto.

For the purpose of illustration in Figs. 1 and 2, a typical heating element, indicated generally by the letter H, for warming foods, is disclosed. This heating unit comprises a bottom wall B, having side walls S extending upwardly therefrom, the side walls each being provided with a plurality of aligned brackets S, upon which may be supported trays of food. The bottom B and side walls S contain a suitable electrical heating element, the ends of which are brought out to electrical terminals T, extending from a rectangular box J, positioned at the rear of the container.

Referring to Figs. 6, 7 and 8, it will be noted that the outer liner 21 is provided with a recess 59, the bottom 31 of the section 27, with a recess 61 and the bottom 34 of the section 28 with a recess 62, the three recesses being aligned and of a size and configuration to provide space for the box J of the heating unit. Similarly, the end wall 8 of the body 1 is provided with an opening 63, and the end walls 9 and 11 with notches 64 and 65 respectively, which provide an opening in both the inner and outer assembled end walls to permit making electrical connection with the terminals T of the heating unit.

It will also be noted that the edge 66 of the bottom portion 34 of the section 28 is offset from the edges of the side portion 35 and edge portion 33 of the section 28, so that when the heating element is installed in the container, substantially no weight will be transmitted to the portion of the bottom 31 of the inner liner adjacent the flange 37 of the cover, which otherwise might have a tendency to bind the flange 37 between the flap 15 of the bottom wall of the body 1 and the adjacent portion of the bottom 31 of the inner liner.

It will be apparent that the size, shape and location of the recesses 59, 61 and 62, as well as that of the opening 63 and notches 64 and 65, will depend entirely upon the shape and size of the particular heating element used in conjunction with the container. Similarly, the use of other types of heating elements may make it unnecessary to provide a double bottom on the inner liner 26, in which case the bottom 34 of the section 28 could be eliminated and, if desired, the entire inner liner made from one sheet, with the top portions 29 and 33 united along their meeting edges, and the notches 54 and 55 taking the form of a slot, similar to the slots 56 or 57 in the body and outer liner respectively. Obviously, any of these forms provide the same features and advantages of construction herein described.

The container and its associated parts may be made of any suitable material, and I have found in practice that very excellent results can be obtained by using single thickness corrugated board for the body member 1 and inner liner 26, with the outer liner 21 formed from a double wall or laminated type of corrugated board. Similarly, the handle 44 may be constructed of suitable fibre board and, if desired, may be provided with scoring 67 to permit the handle to be folded down adjacent to the top 2 of the body when desired.

The device may be formed and assembled as follows:

The various elements are cut and folded as previously described, the respective sheets of material forming the same, preferably being scored, as indicated in dotted lines on the various developments, prior to folding, to facilitate the same.

The flaps 14, 15, 16 and 17 are folded back upon their respective side walls and secured thereto by the stapling 18, after which the side walls are folded at their junctures, and the two meeting edges secured together by the tape 6.

The ears 52 and 53 are secured to the top portions 23 and 29 of the inner liner, as, for example, by the staples 58, and the folded outer liner 21 inserted into the body member from the open end carrying the end walls 7, 8, 9 and 11, the latter being in unfolded position. The inner liner 26 is then inserted in the container and the handle 44 passed through the slot formed by the notches 54 and 55 and the slots 56 and 57 in the body and outer liner respectively, the assembled elements appearing as illustrated in Fig. 2. If desired, the outer and inner liners may be secured together by staples or other means to form a unitary structure which may then be inserted into the body member 1.

The heating unit H is then inserted in the container, also from the same end, after which the end wall halves 9 and 11 are folded inwardly followed by the folding of the end wall halves 7 and 8, and the latter secured in position by the tape 12, which is extended around to the side walls 4 and 5, as indicated at 13 in Fig. 1. After the handle 44 is in operable position, the flap 49 may be passed through the opening 47 and folded around to the position illustrated in Fig. 2.

The container is completed by securing the liner 39 to the cover 36, and folding the flanges 37 at right angles to the plane of the cover, any additional locking means, such as the plates 41, being attached thereto at any suitable stage of the assembly.

It will be apparent that with the present construction, either the liner assembly, or the body member of the container, may be replaced without simultaneously replacing the other. For example, if the body 1 becomes worn or damaged, while the outer and inner liners remain useable, it is only necessary to cut or remove the tape 12, sealing the end walls, open up such end of the body member and remove the outer and inner liners and heating unit therefrom. This may be accomplished by first withdrawing the heating element H, after which the handle 44 may be moved inwardly until it has completely passed through the slot 56 in the body 1, following which both the outer and inner liners may be withdrawn therefrom. The liner assembly may then be assembled in a new body, the handle 44 passed through the slot therein, and the heating element H replaced. The end walls are then folded into position and sealed in the manner illustrated, and the container is again ready for use. In like manner, if for any reason the liner assembly is not useable, but the body member remains useable, a new liner assembly may be installed in the body, following the same procedure above outlined, and resecuring the end walls with a new piece of tape.

It will be apparent from the above description that I have provided a novel container, having qualities particularly adapted for the purposes set forth, embodying a novel liner construction cooperable with a cover member for efficiently sealing the same, and in which the various liner elements and the container body member, as well as a heating element inserted therein, are effectively locked in position to form a unitary structure. Likewise, I have provided a novel container construction wherein the various elements may be replaced after they have become unuseable without affecting the utility of elements that remain in useable condition.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a container, the combination of a body member having four connected side walls and one end wall, the opposite end being open, the ends of said side walls adjacent the open end, each having a peripheral flap integrally formed therewith, said flaps each being folded inwardly back upon its respective side wall, means for maintaining said flaps in folded position relative to their respective side walls to form a reinforced side wall edge, a cover member for the open end so formed, said cover member having peripheral flanges thereon adapted to be inserted into the open end of the body member with said flanges seated upon respective flaps, an outer liner having side walls corresponding to the respective side walls of the body member, said liner side walls being positioned within said body member with the outer faces thereof positioned between said end wall and the respective flaps, and in contact with the inner surfaces of corresponding side walls of the body member, the thickness of the material forming said outer liner being approximately equal to the combined thickness of one of said flaps and its corresponding flange on said cover member, an inner liner having side walls corresponding to the respective side walls of the body member, the outer faces of the inner liner side walls contacting the adjacent faces of said outer liner, and the edges of said inner liner positioned adjacent to said cover member, said body member and outer liner each having a slot therein aligned with each other, and a handle member, secured to said inner liner and extending through the slots in the outer liner and body member respectively.

2. In a container, the combination of a body member constructed from a sheet of material folded to form four connected side walls, means for securing the meeting edges of the folded sheet together, a half end wall integrally connected to each of said side walls at one corresponding end of the latter, each opposed pair of halves being folded inwardly toward each other with opposing edges in abutting relation, one pair forming an inner end wall, and the other pair overlying the latter, forming an outer end wall, means for securing said outer halves in abutting relation, the corresponding opposite ends of said side walls each having a peripheral flap integrally formed therewith, said flaps each being folded inwardly back upon its respective side wall, means for maintaining said flaps in folded position relative to their respective side walls to form a reinforced side wall edge, a cover member for the open end so formed, said cover member having peripheral flanges thereon adapted to be inserted into the open end of the body member with said flanges seated upon respective flaps, an outer liner formed from a sheet of material folded at intervals to form connected side walls corresponding to the respective side walls of the body member, said liner being positioned within said body member with the outer faces thereof positioned between said end wall and the respective flaps and in contact with the inner surfaces of corresponding side walls of the body member, the thickness of the sheet forming said outer liner being approximately equal to the combined thickness of one of said flaps and its corresponding flange on the cover member, an inner liner comprising two sections each formed from a sheet of material folded to form a bottom portion and a half top portion connected by a side portion, said sections being positioned in said body member with the top portions in substantially abutting relation, and the bottom portions in superimposed relation, the outer faces of the inner liner contacting the adjacent faces of said cover member superimposed upon the respective flanges of the latter, and means carried by said flanges engageable with said flaps on the body member for locking the cover member to the latter.

3. In a container insert, the combination of an inner liner comprising two halves, each formed from a sheet of material folded to form a bottom portion and a half top portion connected by a side portion, said sections being positioned with the top portions in substantially abutting relation, and the bottom portions in overlying relation, an outer liner having side walls corresponding to the respective side walls of the inner liner, the inner faces of said outer liner contacting the adjacent surfaces of the respective top, bottom and side portions of the inner liner, the latter at one end thereof extending beyond the corresponding end of the outer liner, the side wall of the latter adjacent said top portions of the inner liner having a slot therein, and a handle member secured to said top portions of the inner liner and extending through the slot in the outer liner.

4. In a container insert, the combination of an outer liner formed from a sheet of material folded at intervals to form connected side walls, an inner liner comprising two halves each formed from a sheet of material folded to form a bottom portion and a half top portion connected by a side portion, said halves being positioned in said outer liner, with the top portions in substantially abutting relation, and the bottom portions in overlying relation, the outer faces of the inner liner contacting the adjacent faces of said outer liner, and the depth of said inner liner being greater than the depth of the outer liner, said outer liner having a slot therein aligned with the juncture of the top portions of the inner liner, and a handle member having a hand engageable portion, ears extending outwardly from said hand engageable portion, the latter extending between the juncture of the top portions of the inner liner and through the slot in the outer liner, with said ears in contact with and secured to respective adjacent top portions of the inner liner.

5. In a container insert, the combination of an outer liner formed from a sheet of material folded at intervals to form connected side walls, an inner liner comprising two halves each formed from a sheet of material folded to form a bottom portion and a half top portion connected by a side portion, said halves being positioned in said outer liner, with the top portions in substantially abutting relation, and the bottom portions in overlying relation, the outer faces of the inner liner contacting the adjacent faces of said outer liner, and the depth of said inner liner being greater than the depth of the outer liner, said outer liner having a slot therein aligned with the juncture of the top portions of the inner liner, and a handle member, comprising a sheet of material folded back upon itself and cut to form a hand engageable portion of double thickness, the said last mentioned sheet being folded in opposite direction along lines equally spaced from said first mentioned fold to provide ears extending outwardly from said hand engageable portion, the latter extending between the juncture of the top portions of the inner liner and through the slot in the outer liner, with said ears in contact with and secured to respective adjacent top portions of the inner liner.

BERT O. KUEHLHORN.

REFERENCES CITED

The following references are of record in the file of this patent:

UNITED STATES PATENTS

| Number | Name | Date |
| --- | --- | --- |
| 674,009 | Lewis | May 14, 1901 |
| 1,158,715 | Potter | Nov. 2, 1915 |
| 1,377,092 | Phaneuf | May 3, 1921 |
| 1,794,821 | Andrews | Mar. 3, 1931 |
| 1,909,214 | Nagle | May 16, 1933 |
| 1,959,193 | Boeye | May 15, 1934 |
| 1,986,145 | Goodyear | Jan. 1, 1935 |
| 2,021,234 | Gomes | Nov. 19, 1935 |

FOREIGN PATENTS

| Number | Country | Date |
| --- | --- | --- |
| 23,958 | Norway | Oct. 27, 1913 |